UNITED STATES PATENT OFFICE.

WALTER T. SCHEELE, OF HACKENSACK, NEW JERSEY, ASSIGNOR TO H. MORTIMER SPECHT, OF NEW YORK, N. Y.

CELLULOSE SOLUTION.

1,408,035.  Specification of Letters Patent.  Patented Feb. 28, 1922.

No Drawing.  Application filed November 24, 1920.  Serial No. 426,169.

*To all whom it may concern:*

Be it known that I, WALTER T. SCHEELE, a citizen of the State of Germany, and having declared my intention of becoming a citizen of the United States of America, residing at 325 Main Street, Hackensack, in the county of Bergen and State of New Jersey, have invented certain new and useful Improvements in Cellulose Solutions, of which the following is a specification.

This invention relates to improvement in cellulose solutions and has for its object the production of solutions of cellulose which are capable of use for many purposes.

Broadly stated, the invention consists in the production of a solution in which cellulose acetate is dissolved in ethyl-methyl-ketone or a higher ketone together with copal.

The improved solution may be used as varnishes, driers, lacquers, for the production of films plates, waterproof fabrics, artificial leather, artificial silk, and the like.

In the specification of U. S. Patent No. 744,413 of November 17th 1903, I have described a process of manufacturing varnishes, laquers and the like by dissolving copal in a suitable ketonic solvent, preferably ethyl-methyl-ketone.

I have discovered that a greatly improved product is obtained by incorporating a cellulose acetate which is soluble in the solvent.

While any suitable cellulose acetate may be used, I find that the acetic cellulose product which is described in my copending U. S. patent application Serial No. 419,108, gives highly satisfactory results. Any ketones boiling between 80° and 227° C. may be used or any mixture of these ketones. The following ketones may be used according to the present invention caprone, butyl, propyl ethyl butyl, methyl valeral valerone and methyl amyl ketones ethyl-methyl ketone is, however, preferred.

In order to illustrate the invention the following example is given, but it must be understood that the invention is not restricted thereto.

Dried acetic cellulose produced according to the aforesaid U. S. specification Serial No. 419,108 is mixed with an equal quantity of finely ground Manila copal care being taken that both substances have only a small content of moisture. This mixture is added to ethyl-methyl ketone in the proportions of about 3 lbs. of mixture to one gallon of solvent. The mixture is brought into solution by slight agitation and in about one hour the solution is complete without any heating and a perfect solution results which can be used as a first grade lacquer.

The proportions of the cellulose derivative and the resinous material may be varied within wide limits and compositions suitable for various purposes produced. Any other suitable ingredients may be added for the production of special properties. For instance by adding tetrachlorethane the quick drying qualities are diminished. By incorporating with camphor a plastic mass can be produced which is available for many purposes for which celluloid and the like are used. Addition of castor oil in the copal cellulose solution increases the pliability of the products.

I claim:

1. A solution comprising copal and cellulose acetate dissolved in ethyl-methyl-ketone.

2. A solution comprising copal and cellulose acetate dissolved in ketone having a boiling point between 80° and 227° C.

In testimony whereof I affix my signature.

WALTER T. SCHEELE.